United States Patent
Swarup et al.

(10) Patent No.: US 6,884,845 B2
(45) Date of Patent: Apr. 26, 2005

(54) LOW TEMPERATURE CURABLE, TWO-COMPONENT, WATERBORNE FILM-FORMING COMPOSITION

(75) Inventors: Shanti Swarup, Allison Park, PA (US); Thi Bach-Phuong Dau, Stuttgart (DE)

(73) Assignee: PPG Industries Ohio, Inc., Cleveland, OH (US)

( * ) Notice: Subject to any disclaimer, the term of this patent is extended or adjusted under 35 U.S.C. 154(b) by 231 days.

(21) Appl. No.: 10/151,283

(22) Filed: May 20, 2002

(65) Prior Publication Data

US 2003/0216516 A1 Nov. 20, 2003

(51) Int. Cl.$^7$ .............................................. C08G 18/62
(52) U.S. Cl. ........................ 525/131; 524/802; 524/832; 428/423.1
(58) Field of Search ................ 524/802, 832; 525/131; 428/423.1

(56) References Cited

U.S. PATENT DOCUMENTS

| | | | |
|---|---|---|---|
| 5,460,892 A | 10/1995 | Bederke et al. | 428/482 |
| 6,080,296 A | 6/2000 | Lieverz et al. | 204/488 |
| 6,139,918 A | * 10/2000 | Irle et al. | 427/385.5 |
| 6,251,985 B1 | 6/2001 | Wamprecht et al. | 524/539 |

OTHER PUBLICATIONS

M. Szycher; Polyurethanes; 1999; p. 4–16, 4–17.*

* cited by examiner

*Primary Examiner*—Rachel Gorr
(74) *Attorney, Agent, or Firm*—Deborah M. Altman

(57) ABSTRACT

A waterborne film-forming composition is provided that includes a stable aqueous dispersion of a mixture of a polyester polyol and a carboxylic acid-containing acrylic polymer polyol having a weight ratio of polyester polyol to acrylic polymer polyol in the range of 10:90 to 30:70; and a polyisocyanate crosslinking agent where the equivalent ratio of hydroxyl groups to isocyanate groups is from 0.8:1 to 1.7:1. The polyol component is prepared by polymerizing a mixture of ethylenically unsaturated polymerizable monomers that includes at least one carboxylic acid group-containing monomer; at least one primary alcohol group-containing monomer; and at least one glycidyl ester of an aliphatic saturated monocarboxylic acid in the presence of at least one polyester polyol. Multi-layer composite coatings and coated substrates are also provided.

28 Claims, No Drawings

US 6,884,845 B2

LOW TEMPERATURE CURABLE, TWO-COMPONENT, WATERBORNE FILM-FORMING COMPOSITION

BACKGROUND OF THE INVENTION

1. Field of the Invention

The present invention relates to aqueous coating compositions curable at low temperatures, as well as multi-component composite coating compositions including pigmented or colored base coats overcoated with transparent or clear topcoats, providing good smoothness and appearance in automotive coating applications.

2. Background of the Invention

Over the past decade, there has been a concerted effort to reduce atmospheric pollution caused by volatile solvents that are emitted during the painting process. However, it is often difficult to achieve high quality, smooth coating finishes, such as are required in the automotive industry, without using organic solvents which contribute greatly to flow and leveling of a coating.

One of the major goals of the coatings industry is to minimize the use of organic solvents by formulating waterborne coating compositions which provide a smooth, high gloss appearance, as well as good physical properties including resistance to acid rain. Unfortunately, many waterborne coating compositions do not provide acceptable appearance, particularly when cured at lower temperatures, assuming low temperature cure is possible at all. Many automotive manufacturers are interested in coatings that cure at lower temperatures in order to reduce energy costs.

Another challenge to formulators of waterborne coatings is to provide good acid resistance while maintaining acceptable physical properties. Lack of humidity resistance or blushing is another problem facing waterborne coating formulators.

U.S. Pat. No. 4,350,809 to Fischer et al. discloses a process for the preparation of copolymers containing hydroxyl groups by free radical polymerization of at least two unsaturated copolymerizable monomers, at least one of which contains at least one carboxyl group, in the presence of at least one alkyl glycidyl ester of an aliphatic saturated monocarboxylic acid with a tertiary or quaternary α-carbon atom. The resulting polymers are advantageous because of their relatively low solution viscosities.

U.S. Pat. No. 5,663,265 to Epple et al. discloses low-viscosity copolymers useful in coating compositions. The copolymers contain hydroxyl and carboxyl groups and are obtained by free-radical polymerization of at least two olefinically unsaturated copolymerizable monomers of which at least one contains at least one carboxyl group and at least one is sterically hindered in the presence of one or more glycidyl esters of aliphatic saturated monocarboxylic acids having a tertiary or quaternary α-carbon atom. The copolymers are useful in clearcoat coating compositions, which demonstrate notable resistance to sulfuric acid and xylene, as well as a high degree of hardness.

U.S. Pat. No. 5,596,057 to Epple et al. discloses low viscosity copolymers prepared by bulk polymerization. The polymerization includes charging a material with functional groups that react with the carboxyl groups of the monomers and polymerizing at least two olefinically unsaturated copolymerizable monomers, at least one of which contains at least one carboxyl group and at least one of which is sterically hindered. The copolymers are useful in coating compositions.

U.S. Pat. No. 4,322,508 to Peng et al. discloses a thermosetting coating composition which includes a hydroxy functional component and a crosslinking agent capable of reacting with hydroxy functionality of the hydroxy functional component. The hydroxy functional component includes an oligoester formed by an esterification reaction between a carboxylic acid and an epoxide and a hydroxy functional copolymer. The hydroxy functional copolymer includes residues from one or more hydroxy functional monomers. The thermosetting compositions have a short shelf life, however, because the oligoester and hydroxy functional copolymer in the hydroxy functional component tend to separate over time.

It would be desirable to provide a coating composition which provides the benefits of including a combination of hydroxy functional polyesters and hydroxy functional acrylic copolymers, such that they do not tend to separate over time, providing a storage stable coating composition. The resultant coatings should have a balance of physical properties, including high gloss, hardness, impact resistance, flexibility, weatherability and chemical resistance.

SUMMARY OF THE INVENTION

The present invention is directed to a two-component, waterborne film-forming composition. The film-forming composition includes:

(A) a stable aqueous dispersion of a mixture of a polyester polyol and a carboxylic acid-containing acrylic polymer polyol having a weight ratio of polyester polyol to acrylic polymer polyol in the range of 10:90 to 30:70; and (B) a polyisocyanate crosslinking agent where the equivalent ratio of hydroxyl groups in (A) to isocyanate groups in (B) is from 0.8:1 to 1.7:1.

The polyol component (A) is prepared by polymerizing a mixture of ethylenically unsaturated polymerizable monomers that include at least one carboxylic acid group-containing monomer; at least one primary alcohol group-containing monomer; and at least one glycidyl ester of an aliphatic saturated monocarboxylic acid in the presence of at least one polyester polyol.

The present invention is further directed to a multi-layer composite coating that includes:

(I) a base coat layer deposited from an aqueous pigmented film-forming base coat composition; and (II) a substantially pigment-free topcoat deposited over at least a portion of the base coat layer (I) from a topcoat composition that includes the two-component, waterborne film-forming composition described above.

The present invention is also directed to a coated substrate. The coated substrate includes a substrate and the two-component, waterborne film-forming composition described above over at least a portion of the substrate.

The present invention is additionally directed to a coated substrate that includes a substrate and the multi-layer composite coating composition described above over at least a portion of the substrate.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value equal to or less than 10. Because the disclosed numerical ranges are continuous, they include every value between the minimum and maximum values. Unless expressly indicated otherwise, the various numerical ranges specified in this application are approximations.

As used herein, "substantially free" means to indicate that a material is present as an incidental impurity. In other words, the material is not intentionally added to an indicated composition, but may be present at minor or inconsequential levels because it was carried over as an impurity as part of an intended composition component.

As used herein, "thermosetting composition" means one which "sets" irreversibly upon curing or crosslinking, wherein the polymer chains of the polymeric components are joined together by covalent bonds. This property is usually associated with a cross-linking reaction of the composition constituents often induced by heat or radiation. Hawley, Gessner G., *The Condensed Chemical Dictionary, Ninth Edition*, page 856; *Surface Coatings, vol. 2*, Oil and Colour Chemists' Association, Australia, TAFE Educational Books (1974). Once cured or crosslinked, a thermosetting composition will not melt upon the application of heat and is insoluble in solvents. By contrast, a "thermoplastic composition" comprises polymeric components which are not joined by covalent bonds and thereby can undergo liquid flow upon heating and are soluble in solvents. Saunders, K. J., *Organic Polymer Chemistry*, pp. 41–42, Chapman and Hall, London (1973).

As used herein, "polymer" is meant to encompass oligomer, and includes without limitation both homopolymers and copolymers. Also, as used herein, "reactive" refers to a functional group that forms a covalent bond with another functional group under conditions sufficient to cure the composition. As used herein, "(meth)acrylate" and like terms are intended to include both acrylates and methacrylates.

As used herein, "polyisocyanate" is intended to include blocked (or capped) isocyanates as well as unblocked (poly) isocyanates. The polyisocyanate can be an aliphatic or an aromatic polyisocyanate, or a mixture of the foregoing two. Diisocyanates can be used, although higher polyisocyanates such as isocyanurates of diisocyanates are often used. Higher polyisocyanates also can be used in combination with diisocyanates. Isocyanate prepolymers, for example, reaction products of polyisocyanates with polyols, also can be used. Mixtures of polyisocyanate curing agents can be used.

As used herein, "substantially pigment-free coating composition" means a coating composition which forms a transparent coating, such as a clearcoat in a multi-component composite coating composition. Such compositions are sufficiently free of pigment or particles such that the optical properties of the resultant coatings are not seriously compromised. As used herein, "transparent" means that the cured coating has a BYK Haze index of less than 50 as measured using a BYK/Haze Gloss instrument.

As used herein, the phrase components "are different from each other" refer to components which do not have the same chemical structure as other components in the composition.

As used herein, "cure" as used in connection with a composition, e.g., "composition when cured," means that any crosslinkable components of the composition are at least partially crosslinked. In certain embodiments of the present invention, the crosslink density of the crosslinkable components, i.e., the degree of crosslinking, ranges from 5% to 100% of complete crosslinking.

As used herein, "stable dispersion" refers to a liquid having a liquid continuous phase and a dispersed phase, which may be a liquid, a solid or a combination thereof, where the dispersed phase does not agglomerate, coalesce, settle or separate from the continuous phase between the period of time the dispersion is prepared and when it is used, typically a period of time not exceeding two years at ambient conditions.

As used herein, "two-component system" refers to a coating that includes two components stored or packaged separately and mixed together just prior to application to a suitable substrate. The two components include a first component that contains one or more polyols and a second component that includes one or more crosslinking or curing agents that are reactive with the hydroxyl functionality of the polyols.

The two-component, waterborne film-forming composition of the present invention includes:

Component (A), hereinafter referred to as (A), a stable aqueous dispersion of a combination of a polyester polyol and a carboxylic acid-containing acrylic polymer polyol as a first component; and Component (B), hereinafter referred to as (B), a polyisocyanate crosslinking agent as a second component.

The polyester polyol component in (A) can provide flow and leveling properties to the waterborne film-forming composition. These physical properties of the composition lead to a smooth topcoat film in the multi-component composite coating composition. The polyester polyol is present in an amount sufficient to provide a smooth film as indicated by the occurrence of no more than three craters in an 4 inch (10.2 cm) by 10 inch (25.4 cm) coated area.

The acrylic polymer polyol component in (A) provides film properties such as hardness, gloss, acid resistance and delamination resistance in the topcoat film in the multi-component composite coating composition. The acrylic polymer polyol is present in an amount sufficient to provide a 20° gloss as measured using a Novo Gloss Statistical Glossmeter (Paul N. Gardner Company, Inc., Pompano Beach, Fla.) of at least 90, typically at least 95 of the multi-component composite coating composition. Alternatively or collectively, the acrylic polymer polyol is also present in an amount sufficient to provide a hardness as measured using a Tukon Microhardness Instrument Model 300 (Wilson Instruments Division of Instron Corporation, Canton, Mass.) of at least 70, typically at least 75 of the multi-component composite coating composition.

The weight ratio of the polyester polyol to the acrylic polymer polyol in (A) may be 10:90 or higher, in some cases 12.5:87.5 or higher, in other cases 15:85 or higher and at other times 17.5:82.5 or higher. Additionally, the weight ratio of the polyester polyol to the acrylic polymer polyol in (A) may be 30:70 or lower, in some cases 27.5:72.5 or lower, in other cases 25:75 or lower and at other times 22.5:77.5. The weight ratio of the polyester polyol to the acrylic polymer polyol in (A) may be 20:80. The higher and lower designation refers to the level of the polyester polyol. The weight ratio of the polyester polyol to the acrylic polymer polyol is determined by the properties that are to be incorporated into the resulting coating. The weight ratio of the polyester polyol to the acrylic polymer polyol may be any value or any range of values inclusive of those stated above.

The equivalent ratio of hydroxyl groups in (A) to isocyanate groups in (B) may be 0.8:1 or higher, in some cases 1:1 or higher, in other cases 1.1:1 or higher, in some instances 1.2:1 or higher and at other times 1.35:1 or higher. Additionally, the equivalent ratio of hydroxyl groups in (A) to isocyanate groups in (B) may be 1.7:1 or lower, in some cases 1.65:1 or lower, in other cases 1.6:1 or lower, in some instances 1.55:1 or lower and at other times 1.5:1 or lower. The equivalent ratio of hydroxyl groups in (A) to isocyanate groups in (B) may be 1.4:1. The higher and lower designation refers to the level of the hydroxyl groups. The equivalent ratio of hydroxyl groups in (A) to isocyanate groups in (B) is determined by the properties that are to be incorporated into the resulting coating. When the isocyanate functionality is too high, it may react and/or may be unstable. When the hydroxyl functionality is too high, an undesirable soft film coating may result. The equivalent ratio of hydroxyl groups in (A) to isocyanate groups in (B) may be any value or any range of values inclusive of those stated above.

As used herein, "equivalent ratio" means the ratio of chemical equivalents of hydroxyl functionality to chemical equivalents of isocyanate functionality. A chemical equivalent is the quantity of a material that supplies one mole of a functional group. T. L. Brown and H. E. LeMay, *Chemistry: The Central Science*, page 346, 1977.

In an embodiment of the present invention, component (A) may be prepared by polymerizing a mixture of ethylenically unsaturated polymerizable monomers in the presence of at least one glycidyl ester of an aliphatic saturated monocarboxylic acid and at least one polyester polyol. In this embodiment, the monomer mixture includes at least one carboxylic acid group-containing monomer and at least one primary alcohol group-containing monomer, which form an acrylic polyol.

Typically, when the polymerization is complete, an amine is added to component (A) in an amount sufficient to provide a pH of from 7 to 10 when component (A) is dispersed in water. In an embodiment of the present invention, the pH is increased by using one or more suitable volatile amines. Examples of suitable volatile amines include, but are not limited to, dimethylethanolamine, ammonia, triethyl amine and diethyl propanol amine.

The polymerization described above is generally carried out by introducing the monomer mixture that includes at least one carboxylic acid group-containing monomer and at least one primary hydroxyl group-containing monomer to a suitable reactor to which at least one glycidyl ester of an aliphatic saturated monocarboxylic acid and at least one polyester polyol are added. A suitable free radical polymerization initiator is also added. In an embodiment of the present invention, the polymerization is run in the substantial absence of a solvent.

Any suitable free radical initiator may be used in the polymerization. Suitable free radical initiators include, but are not limited to, thermal initiators, photoinitiators and oxidation-reduction initiators. Examples of thermal initiators include, but are not limited to, azo compounds, peroxides and persulfates. Suitable persulfates include, but are not limited to, sodium persulfate and ammonium persulfate. Oxidation-reduction initiators may include as non-limiting examples persulfate-bisulfite systems as well as systems utilizing thermal initiators in combination with appropriate metal ions such as iron or copper.

Suitable azo compounds include, but are not limited to non-water-soluble azo compounds such as 1-1'-azobiscyclohexanecarbonitrile, 2-2'-azobisisobutyronitrile, 2-2'-azobis(2-methylbutyronitrile), 2-2'-azobis (propionitrile), 2-2'-azobis(2,4-dimethylvaleronitrile), 2-2'-azobis(valeronitrile), 2-(carbamoylazo)-isobutyronitrile and mixtures thereof; and water-soluble azo compounds such as azobis tertiary alkyl compounds including, but not limited to, 4-4'-azobis(4-cyanovaleric acid), 2-2'-azobis(2-methylpropionamidine)dihydrochloride, 2,2'-azobis[2-methyl-N-(2-hydroxyethyl)propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N,N'-dimethyleneisobutyramidine) dihydrochloride and mixtures thereof.

Suitable peroxides include, but are not limited to hydrogen peroxide, methyl ethyl ketone peroxides, benzoyl peroxides, di-t-butyl peroxides, di-t-amyl peroxides, dicumyl peroxides, diacyl peroxides, decanoyl peroxide, lauroyl peroxide, peroxydicarbonates, peroxyesters, dialkyl peroxides, hydroperoxides, peroxyketals and mixtures thereof.

Any suitable carboxylic acid group-containing monomer may be used to make the acrylic polyol of the present invention, so long as it may be polymerized under the conditions described above. Examples of suitable carboxylic acid group-containing monomers include, but are not limited to (meth)acrylic acid, maleic acid and its corresponding anhydride, itaconic acid, aconitic acid, fumaric acid, alpha-halo acrylic acid, vinyl acetic acid and beta-carboxymethyl (meth)acrylate.

Any suitable monomer containing a primary hydroxyl group may be used to make the acrylic polyol of the present invention, so long as it may be polymerized under the conditions described above. Examples of suitable monomers containing a primary alcohol groups include, but are not limited to hydroxyethylacrylate, hydroxyethylmethacrylate, hydroxypropyl acrylate, hydroxypropylmethacrylate, hydroxybutyl (meth)acrylate, glycerol allyl ether, ethylene oxide esters of (meth)acrylic acid and propylene oxide esters of (meth)acrylic acid.

Other suitable polymerizable ethylenically unsaturated monomers may be used in making the acrylic polyol of the present invention. Other suitable monomers include, but are not limited to, $C_1$-$C_{30}$ aliphatic alkyl esters of (meth)acrylic acid, non-limiting examples of which include methyl(meth) acrylate, ethyl(meth)acrylate, propyl(meth)acrylate, N-butyl (meth)acrylate, t-butyl(meth)acrylate, 2-ethylhexyl(meth) acrylate, isobornyl (meth)acrylate, glycidyl (meth)acrylate, dimethylaminoethyl (meth)acrylate, N-butoxy methyl (meth)acrylamide, lauryl (meth)acrylate, cyclohexyl (meth)

acrylate, and 3,3,5-trimethylcyclohexyl (meth)acrylate. Other non-limiting examples of suitable monomers include (meth)acrylamide, N,N dialkyl (meth)acrylamides dimethylaminoethyl (meth)acrylate, vinyl aromatic compounds such as styrene and vinyl toluene, nitrites such as (meth) acrylonitrile, vinyl and vinylidene halides such as vinyl chloride and vinylidene fluoride and vinyl esters such as vinyl acetate.

Carbamate functional groups can be included in the acrylic polyol polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. Other useful carbamate functional monomers are disclosed in U.S. Pat. No. 5,098,947 to Metzger et al., which is incorporated herein by reference.

While not being bound to a single theory, it is believed that forming the acrylic polyol in the presence of the polyester polyol results in the formation of a stable polymer-polymer complex. The stability of the polymer-polymer complex may arise from the association of hydrophobic portions of the polyester polyol and acrylic polyol polymer backbones. On the other hand, a portion of the formed acrylic polyol may graft onto the polyester polyol backbone. Additionally, the acrylic polyol and polyester polyol may become inseparably commingled and entangled. Combinations of associations may exist to the point that an interpenetrating polymer network is formed between the polyester polyol and acrylic polyol. Regardless of the method or reason, the combination of the acrylic polyol and polyester polyol demonstrates superior storage stability when compared to prior art physical blends or mixtures of such materials.

In order to facilitate the formation of an interpenetrating polymer network structure, one or more crosslinking monomers may be utilized in the monomer mixture. The amount of crosslinking monomer used will depend on the degree of branching or crosslinking desired. If mild branching is desired, a relatively low level of crosslinking monomer will be used, whereas if a highly crosslinked acrylic polyol is desired, a higher level of crosslinking monomer will be used. Suitable crosslinking monomers include compounds having two or more functional groups that will react with a free radical. As a non-limiting example, compounds having two or more reactive unsaturated groups may be used. Suitable crosslinking monomers that may be used in the monomer mix include, but are not limited to ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, 1,1,1-tris(hydroxymethyl)ethane di(meth)acrylate, 1,1,1-tris(hydroxymethyl)ethane tri(meth)acrylate, 1,1,1-tris(hydroxymethyl)propane di(meth)acrylate, 1,1,1-tris(hydroxymethyl)propane tri(meth)acrylate, triallyl cyanurate, triallyl isocyanurate, triallyl trimellitate, diallyl phthalate, diallyl terephthalate, divinyl benzene, methylol (meth)acrylamide, triallylamine, and methylenebis (meth)acrylamide.

In the polymerization method described above, the equivalent ratio of the carboxylic acid groups from the carboxylic acid group-containing monomer to the epoxy group of the glycidyl ester of an aliphatic saturated monocarboxylic acid may be greater than 1:1, in some cases at least 1.01:1, in other cases at least 1.1:1, in other instances 1.2:1 and in other cases at least 1.25:1. In one particular embodiment, the carboxylic acid groups derived from the carboxylic acid group-containing monomer are present in excess of the epoxy group of the glycidyl ester of an aliphatic saturated monocarboxylic acid. Generally, the carboxylic acid functional groups of the carboxylic acid functional monomers react with the epoxy group of the glycidyl ester of an aliphatic saturated monocarboxylic acid, resulting in the formation of the corresponding ester group and a secondary hydroxyl group.

Any suitable glycidyl ester of an aliphatic saturated monocarboxylic acid may be used in the present invention. In an embodiment of the present invention, the glycidyl ester of an aliphatic saturated monocarboxylic acid is a glycidyl ester having structure (I).

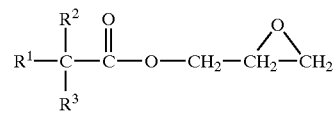

In structure (I), $R^1$ is $C_1$–$C_{18}$ linear or branched alkyl, and $R^2$ and $R^3$ are independently selected from H and $C_1$–$C_{18}$ linear or branched alkyl. Non-limiting examples of suitable glycidyl esters of carboxylic acids include VERSATIC ACID 911 and CARDURA E, each of which is commercially available from Resolution Performance Products.

The acrylic polyol used in the present invention may be of any suitable molecular weight. The molecular weight of the acrylic polyol may be at least 250, in some cases at least 500, in other cases at least 750, in some instances at least 1,000 and in other instances at least 1,500. Additionally, the molecular weight of the acrylic polyol may be up to 25,000, in some cases up to 15,000, in other cases up to 10,000, in some instances up to 7,500 and in other instances up to 5,000 as determined by GPC using polystyrene standards. The molecular weight of the acrylic polyol is selected based on the flow properties desired in component (A) and the properties desired in the coating film resulting from the present two-component, waterborne film-forming composition. The molecular weight of the acrylic polyol may be any value or any range of values inclusive of those stated above.

As described above, the carboxylic acid functional monomer may be present in excess compared to the glycidyl ester of an aliphatic saturated monocarboxylic acid. Thus, the acrylic polyol may contain carboxylic acid functionality derived from residual carboxylic acid groups. The acrylic polyol may have an acid value of at least 1, in some cases at least 2, in other cases at least 5, in some instances at least 10 and in other instances at least 25 mg KOH/g resin. Additionally, the acrylic polyol may have an acid value of not more than 100, in some cases not more than 75, in other cases not more than 50, in some instances not more than 40 and in other instances not more than 35 mg KOH/g resin. The acid value (number of milligrams of KOH per gram of solid required to neutralize the acid functionality in the resin) is a measure of the amount of acid functionality in the resin. The acid value of the acrylic polyol may be any value or any range of values inclusive of those stated above.

Any suitable polyester polyol may be used in the present invention. As a non-limiting example, useful polyester polymers typically include the condensation products of polyhydric alcohols and polycarboxylic acids. Suitable polyhydric alcohols can include ethylene glycol, neopentyl glycol, trimethylol propane, and pentaerythritol. Suitable polycarboxylic acids can include adipic acid, 1,4-cyclohexyl dicarboxylic acid and hexahydrophthalic acid. Besides the polycarboxylic acids mentioned above, functional equivalents of the acids such as anhydrides where they exist or lower alkyl esters of the acids such as the methyl esters can be used. Also, small amounts of monocarboxylic acids such as stearic acid can be used. The ratio of reactants and reaction conditions are selected to result in a polyester polymer with the desired pendent functionality, i.e., carboxyl or hydroxyl functionality.

As a non-limiting example, hydroxyl group-containing polyesters can be prepared by reacting an anhydride of a dicarboxylic acid, such as hexahydrophthalic anhydride, with a diol such as neopentyl glycol in a 1:2 molar ratio. Where it is desired to enhance air-drying, suitable drying oil fatty acids may be used and include those derived from linseed oil, soya bean oil, tall oil, dehydrated castor oil or tung oil.

As a non-limiting example, the polyester polyol may be prepared by reacting one or more polyepoxides with one or more polycarboxylic acids. Useful polyepoxides contain at least two epoxy groups with the diepoxides being most preferred. Among the preferred diepoxides useful in the preparation of such a polyester polyol are diglycidyl ether of bisphenol A and butyl diglycidyl ether. Useful polycarboxylic acids may be selected from aliphatic, cycloaliphatic, and aromatic polycarobxylic acids and mixtures thereof, with those containing no ethylenic unsaturation and bearing no hydroxy functionality being most preferred. Exemplary of the many acids which may be employed are phthalic acid, isophthalic acid, terephthalic acid, oxallic acid, malonic acid, succinic acid, glutaric acid, adipic acid, pimelic acid, suberic acid, 1,4-napthalenedicarboxylic acid, 2,3-napthalenedicarboxylic acid, 2,6-napthalenedicarboxylic acid, and the like. Additionally, monocarboxylic acids may be included such as benzoic acid, t-butyl benzoic acid and acetic acid.

It will be appreciated that various combinations of carboxylic acids and epoxides within the scope of the invention other than those specifically discussed above may be reacted in order to provide polyester polyols useful in the present two-component, waterborne film-forming composition. For example, oligoesters bearing hydroxy functionality other than that produced by the esterification reaction may be produced by reacting not just a hydroxy bearing carboxylic acid with an epoxide as discussed above, but by reacting carboxylic acids and epoxides, either of which bears hydroxy functionality.

The polyester polyol used in the present invention may be of any suitable molecular weight. The molecular weight of the polyester polyol may be at least 250, in some cases at least 500, in other cases at least 750, in some instances at least 1,000 and in other instances at least 1,500. Additionally, the molecular weight of the polyester polyol may be up to 25,000, in some cases up to 15,000, in other cases up to 10,000, in some instances up to 5,000 and in other instances up to 3,000 as determined by GPC using polystyrene standards. The molecular weight of the polyester polyol is selected based on the flow properties desired in component (A) and the properties desired in the coating film resulting from the present two-component, waterborne film-forming composition. The molecular weight of the polyester polyol may be any value or any range of values inclusive of those stated above.

The polymer-polymer complex of component (A) may have a hydroxyl equivalent weight of at least 200, in some cases at least 300, in other cases at least 400, in some instances at least 500 and in other instances at least 1,000 grams per equivalent. Additionally, the polymer-polymer complex of component (A) may have a hydroxyl equivalent weight of not more than 5,000, in some cases not more than 4,000, in other cases not more than 3,500, in some instances not more than 3,000 and in other instances not more than 2,000 grams per equivalent. The term "equivalent weight" is a calculated value based on the relative amounts of the various ingredients used in making the specified material and is based on the solids of the specified material. The relative amounts are those that result in the theoretical weight in grams of the material, such as a polymer produced from the ingredients, and give a theoretical number of the particular functional group that is present in the resulting polymer. The theoretical polymer weight is divided by the theoretical number to give the equivalent weight. For example, hydroxyl equivalent weight is based on the equivalents of reactive pendant and/or terminal hydroxyl groups in the hydroxyl-containing polymer.

As was indicated above, in conjunction with component (A) the present two-component, waterborne film-forming composition further includes as component (B), a polyisocyanate crosslinking agent. Any suitable polyisocyanate crosslinking agent may be used in component (B). Examples of suitable polyisocyanate crosslinking agents include, but are not limited to 1,4-tetramethylene diisocyanate, 1,6-hexamethylene diisocyanate, isophorone diisocyanate, 4,4'-methylene-bis-(cyclohexyl isocyanate), p-phenylene diisocyanate, diphenylmethane-4,4'-diisocyanate, 2,4-toluene diisocyanate, 2,6-toluene diisocyanate, triphenylmethane-4,4',4"-triisocyanate, 1,2,4-benzene triisocyanate, polymethylene polyphenyl isocyanate, the isocyanurate of hexamethylene diisocyanate, the biuret of hexamethylene diisocyanate, the isocyanurate of isophorone diisocyanate, meta-$\alpha,\alpha,\alpha',\alpha'$-tetramethylxylylenediisocyanate, and para-$\alpha,\alpha,\alpha',\alpha'$-tetramethylxylylenediisocyanate.

In the present film-forming composition, component (A) and component (B) can react to effect cure at relatively low temperatures when they are admixed. The film-forming composition may cure at ambient temperatures; on the other hand, it may cure at 30° C. or above; if required, it may cure at 60° C. or above; in some cases, it will be required to cure at 70° C. or above, and in other situations at 80° C. or above. Additionally, the film-forming composition may cure at up to 200° C.; on the other hand, it may cure at up to 150° C.; if required, it may cure at up to 140° C.; in some cases, it will be required to cure at up to 130° C. and in other situations at up to 120° C. The cure temperature of the film-forming composition may be any value or any range of values inclusive of those stated above.

Generally, component (A) is present in the film-forming composition of the present invention in an amount of at least 25 weight percent, in some cases at least 30 weight percent, in other cases at least 35 weight percent, in some instances at least 40 weight percent and in other instances at least 50 weight percent based on total resin solids of the film-forming composition. Additionally, component (A) is present in an amount of up to 99 weight percent, in some cases up to 95 weight percent, in other cases up to 90 weight percent, in some instances up to 80 weight percent and in other instances up to 70 weight percent based on total resin solids of the film-forming composition. The amount of component (A) is determined by variables such as the properties desired in the final coated film and the speed of cure. The amount of component (A) may be any value or any range of values inclusive of those stated above.

Generally, component (B) is present in the film-forming composition of the present invention in an amount of at least 1 weight percent, in some cases at least 5 weight percent, in other cases at least 10 weight percent, in some instances at least 20 weight percent and in other instances at least 30 weight percent based on total resin solids of the film-forming composition. Additionally, component (B) is present in an amount of up to 75 weight percent, in some cases up to 70 weight percent, in other cases up to 65 weight percent, in some instances up to 60 weight percent and in other instances up to 50 weight percent based on total resin solids of the film-forming composition. The amount of component (B) is determined by variables such as the properties desired in the final coated film and the speed of cure. The amount of component (A) may be any value or any range of values inclusive of those stated above.

The present invention utilizes what is conventionally referred to as a "two-pack" system, where component (A) and component (B) are separate compositions which are mixed together up to several hours prior to application of the composition to a substrate.

If desired, the present film-forming composition can comprise other optional materials well known in the art of formulated surface coatings, such as surfactants, flow control agents, thixotropic agents such as bentonite clay, fillers, organic cosolvents, catalysts, including phosphonic acids and other customary auxiliaries. These materials can constitute up to 40 percent by weight of the total weight of the coating composition.

The solids content of the present film-forming composition may be at least 20 weight percent, in some cases at least 25 weight percent, in other cases at least 30 weight percent, in some instances at least 35 weight percent and in other instances at least 40 weight percent based on the total weight of the film-forming composition. Additionally, the solids content of the present film-forming composition may be up to 75 weight percent, in some cases up to 70 weight percent, in other cases up to 65 weight percent, in some instances up to 60 weight percent and in other instances up to 50 weight percent based on the total weight of the film-forming composition. The solids content of the film-forming composition may be any value or any range of values inclusive of those stated above.

Any of the film-forming compositions previously described can be used advantageously to form a clear topcoat in a multi-component composite coating, such as a color-plus-clear composite coating. A color-plus-clear composite coating typically comprises a base coat deposited from a pigmented or colored film-forming composition and a transparent or clear topcoat applied over the base coat. A further embodiment of the present invention relates to such a multi-layer composite coating. The multi-layer composite coating includes a base coat layer deposited from a pigmented film-forming base coat composition; and a substantially pigment-free topcoat deposited over at least a portion of the base coat layer from a topcoat composition, where the topcoat composition comprises the present one-component, waterborne film-forming composition.

The multi-component composite coating of the present invention can be applied to various substrates to which they adhere, including wood, metals, glass, cloth, polymeric substrates and the like. They are particularly useful for coating metals and elastomeric substrates that are found on motor vehicles. The compositions can be applied by conventional means including brushing, dipping, flow coating, spraying and the like, but they are most often applied by spraying. The usual spray techniques and equipment for air spraying and electrostatic spraying and either manual or automatic methods can be used. During application of the coating composition to the substrate, ambient relative humidity can range from about 30 to about 60 percent. The coating composition of the present invention is particularly advantageous when applied at an ambient relative humidity ranging from about 40 to about 60 percent, yielding very smooth finishes.

Another embodiment of the present invention is directed to a coated substrate that includes a substrate and the multi-layer composite coating described above over at least a portion of the substrate. Any suitable substrate may be used. As non-limiting examples, the substrate may be a metallic substrate or an elastomeric substrate.

When preparing the present multi-layer composite coating, a base coat coating composition is first applied to the surface of the substrate to be coated. The base coat coating composition can be waterborne, solvent borne or in solid particulate form, i.e., a powder coating, and typically includes a film-forming resin, crosslinking material (such as discussed above) and pigment. Non-limiting examples of suitable base coat coating compositions include waterborne base coats for color-plus-clear composites such as are disclosed in U.S. Pat. Nos. 4,403,003; 4,147,679; and 5,071,904, each of which is incorporated by reference herein.

After application of the base coating composition to the substrate, a film is formed on the surface of the substrate by driving water out of the film by heating or by an air-drying period. Typically, the coating thickness ranges from about 0.1 to about 5 mils (about 2.54 to about 127 microns), and preferably about 0.4 to about 1.5 mils (about 10.16 to about 38.1 microns) in thickness.

The heating will preferably be only for a short period of time and will be sufficient to ensure that the topcoat can be applied to the base coat if desired without the former dissolving the base coat composition. Suitable drying conditions will depend on the particular base coat composition and on the ambient humidity, but in general a drying time of from about 1 to 5 minutes at a temperature of about 80–250° F. (20–121° C.) will be adequate to ensure that mixing of the two coats is minimized. At the same time, the base coat film is adequately wetted by the topcoat composition so that satisfactory intercoat adhesion is obtained. Also, more than one base coat and multiple topcoats may be applied to develop the optimum appearance. Usually between coats, the previously applied coat is flashed, that is, exposed to ambient conditions for about 1 to 20 minutes.

After application of the base coat, any of the previously described film-forming compositions can be applied thereover to form a transparent topcoat. Preferably, the topcoat coating composition is chemically different or contains different relative amounts of ingredients from the base coat coating composition.

The topcoat coating composition can be applied to the surface of the base coat by any of the coating processes discussed above for applying the base coat coating composition to the substrate. The coated substrate may be heated to cure the coating layers. In the curing operation, solvents are driven off and the film-forming materials of the clearcoat and the base coat are each crosslinked. The heating or curing operation may be carried out at ambient temperatures; on the other hand, it may be carried out at 30° C. or above, if required it maybe carried out at 50° C. or above and in some cases it will be required to be carried out at 60° C. or above and in other situations at 70° C. or above. Additionally, the heating or curing operation of the film-forming materials of the clearcoat and the base coat may be carried out at up to 180° C., on the other hand, it may be carried out at up to 160° C., if required it may be carried out at up to 140° C., in some cases it will be required to be carried out at up to 135° C. and in other situations at up to 125° C. The heating or curing operation may be carried out at any temperature or any range of temperatures inclusive of those stated above.

The thickness of the topcoating may be at least 0.25 mils (6.3 microns), in some cases at least 0.5 mils (12.7 microns), in other cases at least 0.75 mils (19.1 microns), in some instances at least 1.0 mils (25.4 microns) and in other instances at least 1.25 mils (31.7 microns). Additionally, the thickness of the clearcoat may be up to 7 mils (177.8 microns), in some cases up to 5 mils (127 microns), in other cases up to 4 mils (101.6 microns), in some instances up to 3 mils (76.2 microns) and in other instances up to 2.5 mils (63.5 microns). The thickness of the clearcoat may be any thickness or any range of thicknesses inclusive of those stated above.

In certain embodiments of the present invention, the crosslink density of the cured film-forming composition, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA Analyzer conducted under nitrogen. This method determines the glass transition temperature and crosslink density of free films of coatings or polymers. These physical properties of a cured material are related to the structure of the crosslinked network.

According to this method, the length, width and thickness of a sample to be analyzed are first measured, the sample is tightly mounted to the Polymer Laboratories MK III apparatus, and the dimensional measurements are entered into the apparatus. A thermal scan is run at a heating rate of 3° C./min, a frequency of 1 Hz, a strain of 120%, and a static force of 0.01N, and sample measurements occur every two seconds. The mode of deformation, glass transition temperature, and crosslink density of the sample can be determined according to this method. Higher crosslink density values indicate a higher degree of crosslinking in the coating.

The two-component, waterborne film-forming composition of the present invention, when used as coating compositions, particularly, topcoating compositions in multiple layer composite coatings, demonstrate excellent gloss, film hardness, solvent and acid resistance while containing minimal volatile organic solvents. Additionally, the low temperatures utilized in curing reduce energy consumption and cost.

The present invention will further be described by reference to the following examples. The following examples are merely illustrative of the invention and are not intended to be limiting. Unless otherwise indicated, all percentages are by weight.

EXAMPLE 1

The ingredients listed below were used to prepare a polyester polyol.

| Component | Weight (grams) |
|---|---|
| 1,4-Cyclohexane Dicarboxylic Acid | 344.0 |
| Isostearic Acid | 568.0 |
| Trimethylol propane | 540.0 |
| Triphenyl phosphite | 3.6 |
| Dibutyltin Oxide | 2.6 |

The components were charged into a three-liter, four-necked round bottom flask equipped with a motor driven stainless steel paddle agitator, a thermocouple to record batch temperature, a Dean-Stark water trap connected with a condenser to collect distillate evolved, and a nitrogen sparge tube.

The synthesis was performed using azeotropic conditions with xylene (3% on solids). Heat was applied to a Glas-Col heating mantle and the temperature was gradually increased to about 220° C. and held until an acid value of less than four, as measured by potentiometric titration with KOH, was obtained.

EXAMPLE 2

This example demonstrates the synthesis of the stable aqueous dispersion of a combination of a polyester polyol and a carboxylic acid-containing acrylic polymer polyol of the present invention. The synthesis uses the ingredients shown below:

| Ingredient | Amount (grams) | Resin Solids (weight %) |
|---|---|---|
| Charge 1 | | |
| Glycidyl ester of branched decanoic acid[1] | 961.9 | 29.5 |
| Charge 2 | | |
| di-t-amyl peroxide | 62.7 | |
| m-styrene dimer | 91.2 | |
| Charge 3 | | |
| Butyl acrylate | 326.5 | 10.0 |
| Styrene | 714.1 | 21.9 |
| Hydroxyethyl acrylate | 668.2 | 20.5 |
| 2-ethylhexyl acrylate | 231.0 | 7.07 |
| Acrylic acid | 363.6 | 11.1 |
| Charge 3A | | |
| Polyester Polyol of Example 1 | 422.1 | 10.0 |
| Charge 4 | | |
| Dimethyl ethanol amine | 120.0 | |
| Charge 5 | | |
| Deionized water | 5538.7 | |

[1]Cardura ™ Resin E-10, Resolution Performance Products, Houston, TX.

Charge 1 was added to a reaction vessel equipped with a reflux condenser and nitrogen blanket and heated to 160° C. Charge 3 and Charge 3A were mixed together and the mixture was added to the reaction vessel over a four-hour period. Beginning at the same time as the mixture, Charge 2 was added to the reaction vessel over a 4.5-hour period, after which time the resulting product continued to be mixed in the vessel at 160° C. The product was cooled to 100° C. and Charge 4 was added over a 30-minute period of time. Charge 5 was pre-heated to 70° C. and added to the vessel over a 30-minute period. The product was mixed for one hour at 100° C. and decanted. The resulting product had total solids of 38.9 weight percent (1 hour at 110° C.), pH of 8.4 and viscosity of 170 cps (Brookfield, RVT spindle #1, 30 rpm at 22.3° C.). The average particle size of the dispersed particles was 0.08–0.09 μm determined by Horiba LA-900 Laser Scattering Particle Size Distribution Analyzer, available from Horiba Instruments, Irvine, Calif.

The resulting latex did not demonstrate any visible sign of separation after standing for 4 months at ambient conditions.

EXAMPLE 3

This is a comparison example demonstrating the synthesis of an aqueous dispersion where a polyester polyol and a carboxylic acid-containing acrylic polymer polyol are physically mixed after synthesis of the acrylic polyol. An acrylic polyol was prepared using the ingredients shown below:

| Ingredient | Amount (grams) | Resin Solids (weight %) |
| --- | --- | --- |
| Charge 1 | | |
| Glycidyl ester of branched decanoic acid[1] | 961.9 | 29.5 |
| Charge 2 | | |
| di-t-amyl peroxide | 62.7 | |
| m-styrene dimer | 91.2 | |
| Charge 3 | | |
| Butyl acrylate | 326.5 | 10.0 |
| Styrene | 714.1 | 21.9 |
| Hydroxyethyl acrylate | 668.2 | 20.5 |
| 2-ethylhexyl acrylate | 231.0 | 7.07 |
| Acrylic acid | 363.6 | 11.1 |
| Charge 4 | | |
| Dimethyl ethanol amine | 120.0 | |
| Charge 5 | | |
| Deionized water | 5538.7 | |

[1]Cardura ™ Resin E-10, Resolution Performance Products, Houston, TX.

Charge 1 was added to a reaction vessel equipped with a reflux condenser and nitrogen blanket and heated to 160° C. Charge 3 was added to the reaction vessel over a four-hour period. Beginning at the same time as the mixture, Charge 2 was added to the reaction vessel over a 4.5-hour period, after which time the resulting product continued to be mixed in the vessel at 160° C. The product was cooled to 100° C. and Charge 4 was added over a 30-minute period of time. Charge 5 was pre-heated to 70° C. and added to the vessel over a 30-minute period. The product was mixed for one hour at 100° C. and decanted. The average particle size of the dispersed particles was 0.08–0.09 μm, determined by Horiba LA-900 Laser Scattering Particle Size Distribution Analyzer. The resulting latex did not demonstrate any visible sign of separation after standing 4 months at ambient conditions.

The acrylic polyol described above was physically mixed with the polyester polyol of Example 1, at a solids ratio of 9:1 acrylic polyol to polyester polyol, using an overhead mixer for 20 minutes. The average particle size of the particles in the resulting dispersion was about 10 μm, determined by Horiba LA-900 Laser Scattering Particle Size Distribution Analyzer. The dispersion separated within a week into two layers, demonstrating its instability compared to the dispersion of the present invention shown in Example 2.

EXAMPLES 4 and 5

A waterbased clearcoat was prepared from the following ingredients:

| | AMOUNT (grams) | |
| --- | --- | --- |
| INGREDIENTS | Example 4 (comparative) | Example 5 |
| Binder emulsion: | | |
| Acrylic emulsion[2] | 43.37 | — |
| Polyurethane emulsion[3] | 6.02 | — |
| Polymer of Example 4 | — | 63.01 |
| Silicone surfactant[4] | 0.55 | 0.50 |
| Silicone oil[5] | 0.07 | 0.02 |
| Deionized water | 22.24 | 6.47 |
| Hardener solution: | | |
| Trimer of HDI[6] | 17.13 | 16.2 |
| Tinuvin 1130[7] | 0.8 | 0.8 |
| Tinuvin 292[7] | 0.4 | 0.4 |
| Butyldiglycol acetate | 1.32 | 2.81 |
| Solvesso 100[8] | 0.74 | 1.87 |
| Dibasic ester[9] | 7.34 | 7.92 |

[2]Available as Bayhydrol VPLS 2271 from Bayer Corporation, Pittsburgh, PA.
[3]Available as Bayhydrol VPLS 2231 from Bayer Corporation.
[4]Available as Byk 345 from the Byk Chemie division of Altana AG, Bad Homburg, Germany.
[5]Available as Byk 333 from Byk Chemie.
[6]Isocynate crosslinker, available from Bayer Corporation.
[7]Available from Ciba Specialty Chemicals Corporation, Tarrytown, NY.
[8]Hydrocarbon solvent, available from ExxonMobile, Houston, TX.
[9]Solvent, available from Rhodia, Paris, France.

The binder emulsion components and hardener solution components were pre-mixed respectively under agitation and then separately stored for one day. Approximately 15 minutes prior to spray application, the hardener was added into the binder emulsion under agitation. This pre-emulsion was further homogenized using a high-pressure disperser at 50 bar.

Application:

Each of the waterborne clearcoat formulations examples was sprayed by hand with a Sata gun (1.3 mm nozzle) in an environment controlled to 21° C. (70° F.) and 60% relative humidity. The coating was applied over a commercial silver metallic waterborne base coat available from PPG Industries, Inc. The base coat was applied in two coats, with 60 second flash between coats and then prebaked for 10 minutes at 80° C. (176° F.). The clearcoat was then applied in two coats without any flash. The clearcoated panels were allowed to flash for five to ten minutes at ambient condition and baked for 10 minutes at 60° C. (140° F.) and finally, for 30 minutes at 140° C. (285° F.) or 40 minutes at 80° C. (194° F.). Panels were baked in a horizontal position. The film build was approximately 50.8 μm (2.0 mils).

Analysis:

Each of the coating examples was evaluated after baking for crater sensitivity and physical properties. An entire 4-inch by 12-inch panel was examined in each case. The total number of craters on each panel was counted. Craters were marked to prevent double counting. The total number of craters appearing in each case is shown in Table 1.

TABLE 1

| Coating Example | Number of Craters |
| --- | --- |
| Example 4 (Comparative) | 7 |
| Example 5 | 1 |

These data show that the film-forming composition of the present invention provides greater resistance to crater formation than that of the comparative example prepared with a commercially available polymer.

Delamination Test:

Demineralized water was dripped onto test panels at 63° C. for 72 hours. The test panel were then taken off of the water drip and dried with a clean cloth. Subsequently, the surface was scratched using a Cross-Cut Tester (Byk-Chemie, Wesel, Germany) by cutting through the film to the substrate in one steady motion. A second cut was made, perpendicular to and centered on the first cut. Next, a lap of tape (Scotch Brand 800, 3M, St. Paul, Minn.) was placed on and rubbed firmly over the cut. The tape was removed in a rapid upward motion. The tape and removal step was then repeated. Separation of the coating from the substrate should be no more than 1 mm along the scratch with no separation of the coating on the remaining area.

Acid Test 1:

A Gradient oven from Byk Gardner was used at a temperature range of 41–81° C. Several drops (each with a volume of 250 μl) of a solution of 10% by weight sulfuric acid was applied to a preheated test panel at distance corresponding to the heating elements. Application of the acid solution was completed within 60 seconds, after which temperature stressing of the test panel for a period of 30 minutes was begun. The test panel was removed from the gradient oven, then rinsed in deionized water and dried under a cold air stream. The evaluation was performed visually. The temperature at which the test panel showed the first signs of damage was recorded. The temperature at which the first visible signs of damage occur should be greater than 60° C. after 30 minutes of storage time.

Acid Test 2:

Several drops of 38% by weight sulfuric acid were applied to a test panel. No visible signs of damage should be seen before 72 hours at room temperature.

20° Gloss:

Specular gloss was measured at 20° with a Novo Gloss Statistical Glossmeter (Paul N. Gardner Company, Inc., Pompano Beach, Fla.) where higher numbers indicate better performance.

Hardness:

Hardness was measured using the Tukon Microhardness Instrument Model 300 (Wilson Instruments Division of Instron Corporation, Canton, Mass.). Higher numbers indicate better performance.

Results from the evaluations of the coated panels which were baked at 140° C. (285° F.) for gloss, indentation hardness, delamination, humidity resistance, adhesion and acid resistance are summarized below in Table 2.

Humidity:

The humidity resistance of test panels prepared as described above was tested by placing them in a humidity cabinet with constant conditions of 40° C.±3° C. and relative humidity of 100%. To pass the test, the panels must not demonstrate any surface change (blistering, for example) after a minimum of 240 hours in the humidity cabinet.

TABLE 2

|  | Example 4 (Comparative) | Example 5 |
| --- | --- | --- |
| Gloss 20° | 85.9 | 94.2 |
| Hardness | 67 | 71–77 |
| Acid resistance |  |  |
| Test 1 | Fail | Pass |
| Test 2 | Borderline | Pass |

TABLE 2-continued

|  | Example 4 (Comparative) | Example 5 |
| --- | --- | --- |
| Delamination test | Fail | Pass |
| Humidity | Pass | Pass |

These data show that the film-forming compositions of the present invention provide better gloss, hardness, acid resistance and delamination resistance than that of the comparative example prepared with a commercially available polymer.

Those skilled in the art will recognize that changes may be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

We claim:

1. A two-component, waterborne film-forming composition comprising:

(A) a stable aqueous dispersion of a mixture of a polyester polyol and a carboxylic acid-containing acrylic polymer polyol as a first component, prepared by polymerizing a mixture of ethylenically unsaturated polymerizable monomers, in the absence of solvent, comprising:

(1) at least one carboxylic acid group-containing monomer;

(2) at least one primary alcohol group-containing monomer;

(3) at least one glycidyl ester of an aliphatic saturated monocarboxylic acid; and (4) at least one polyester polyol, whereby the polymerization is carried out by feeding a mixture comprising (1), (2) and (4) to a reaction vessel over a period of time, wherein the equivalent ratio of the carboxylic acid groups from the carboxylic acid group-containing monomer to the epoxy group of the glycidyl ester of an aliphatic saturated monocarboxylic acid is greater than 1:1, and wherein the weight ratio of polyester polyol to acrylic polymer polyol is in the range of 10:90 to 30:70; and (B) a polyisocyanate crosslinking agent as a second component, wherein the equivalent ratio of hydroxyl groups in (A) to isocyanate functional groups in (B) is from 0.8:1 to 1.7:1.

2. The film-forming composition of claim 1, wherein the polyester polyol and the carboxylic acid-containing acrylic polymer polyol in (A) are present as a stable polymer-polymer complex.

3. The film-forming composition of claim 1, wherein after polymerization is complete, an amine is added to component (A) in an amount sufficient to provide a pH of from 7 to 10 when component (A) is dispersed in water.

4. The film-forming composition of claim 3, wherein the pH is increased by using one or more volatile amines.

5. The film-forming composition of claim 4, wherein the amines are selected from the group consisting of dimethylethanolamine, ammonia, triethyl amine and diethyl propanol amine.

6. The film-forming composition of claim 1, wherein the polymerization comprises the steps of:

(a) introducing components (1), (2) and (4) to a suitable reactor over a period of time; and (b) adding component (3) to the reactor, along with a suitable free radical polymerization initiator, in the substantial absence of a solvent.

7. The film-forming resin of claim 1, wherein the glycidyl ester (3) is a glycidyl ester having the following structure:

$$R^1-\underset{\underset{R^3}{|}}{\overset{\overset{R^2}{|}}{C}}-\overset{\overset{O}{\|}}{C}-O-CH_2-\underset{\diagdown O \diagup}{CH_2-CH_2}$$

wherein $R^1$ is $C_1$–$C_{18}$ linear or branched alkyl and $R^2$ and $R^3$ are independently selected from H and $C_1$–$C_{18}$ linear or branched alkyls.

8. The film-forming resin composition of claim 1, wherein the carboxylic acid group-containing monomer (1) is one or more selected from the group consisting of acrylic acid and (meth)acrylic acid and the monomer containing a primary alcohol group is one or more selected from the group consisting of hydroxyethylacrylate, hydroxyethylmethacrylate, hydroxypropylacrylate, hydroxypropylmethacrylate and hydroxybutyl (meth)acrylate.

9. The film-forming composition of claim 1, wherein (A) and (B) are curable at a temperature of from 60° C. to 140° C.

10. The film-forming composition of claim 1, wherein the polyisocyanate crosslinking agent is at least one selected from the group consisting of 1,4-tetramethylene diisocyanate, 1,6-hexamethylene diisocyanate, isophorone diisocyanate, 4,4'-methylene-bis-(cyclohexyl isocyanate), p-phenylene diisocyanate, diphenylmethane-4,4'-diisocyanate, 2,4-toluene diisocyanate, 2,6-toluene diisocyanate, triphenylmethane-4,4',4"-triisocyanate, 1,2,4-benzene triisocyanate, polymethylene polyphenyl isocyanate, the isocyanurate of hexamethylene diisocyanate, the biuret of hexamethylene diisocyanate, the isocyanurate of isophorone diisocyanate meta-α,α,α',α'-tetramethylxylylenediisocyanate, and para-α,α-α'-α'-tetramethylxylylenediisocyanate.

11. The film-forming composition of claim 1, wherein the ratio of hydroxyl groups in (A) to isocyanate groups in (B) is from 1.35:1 to 1.5:1.

12. The film-forming resin of claim 1, wherein the mixture of monomers further comprises (5) a crosslinking monomer.

13. A multi-layer composite coating comprising:
(I) a base coat layer deposited from a pigmented film-forming base coat composition; and
(II) a substantially pigment-free topcoat deposited over at least a portion of said base coat layer from a topcoat composition, wherein said topcoat composition is a two-component, waterborne film-forming composition comprising:
(A) a stable aqueous dispersion of a mixture of a polyester polyol and a carboxylic acid-containing acrylic polymer polyol as a first component, prepared by polymerizing a mixture of ethylenically unsaturated polymerizable monomers, in the absence of solvent, comprising:
(1) at least one carboxylic acid group-containing monomer;
(2) at least one primary alcohol group-containing monomer;
(3) at least one glycidyl ester of an aliphatic saturated monocarboxylic acid; and
(4) at least one polyester polyol, whereby the polymerization is carried out by feeding a mixture comprising (1), (2) and (4) to a reaction vessel over a period of time, wherein the equivalent ratio of the carboxylic acid groups from the carboxylic acid group-containing monomer to the epoxy group of the glycidyl ester of an aliphatic saturated monocarboxylic acid is greater than 1:1, and
wherein the weight ratio of polyester polyol to acrylic polymer polyol is in the range of 10:90–30:70; and
(B) a polyisocyanate crosslinking agent as a second component, wherein the equivalent ratio of hydroxyl groups in (A) to isocyanate functional groups in (B) is from 0.8:1 to 1.7:1.

14. The multi-layer composite coating of claim 13, wherein the polyester polyol and the carboxylic acid-containing acrylic polymer polyol in (A) are present as a stable polymer-polymer complex.

15. The multi-layer composite coating of claim 13, wherein after polymerization is complete, an amine is added to component (A) in an amount sufficient to provide a pH of from 7 to 10 when component (A) is dispersed in water.

16. The multi-layer composite coating of claim 15, wherein the pH is increased by using one or more volatile amines.

17. The multi-layer composite coating of claim 16, wherein the amines are selected from the group consisting of dimethylethanolamine, ammonia, triethyl amine and diethyl propanol amine.

18. The multi-layer composite coating of claim 13, wherein the polymerization comprises the steps of:
(a) introducing components (1), (2) and (4) to a suitable reactor over a period of time; and
(b) adding component (3) to the reactor, along with a suitable free radical polymerization initiator, in the substantial absence of a solvent.

19. The multi-layer composite coating of claim 13, wherein the glycidyl ester (3) is a glycidyl ester having the following structure:

$$R^1-\underset{\underset{R^3}{|}}{\overset{\overset{R^2}{|}}{C}}-\overset{\overset{O}{\|}}{C}-O-CH_2-\underset{\diagdown O \diagup}{CH_2-CH_2}$$

wherein $R^1$ is $C_1$–$C_{18}$ linear or branched alkyl and $R^2$ and $R^3$ are independently selected from H and $C_1$–$C_{18}$ linear or branched alkyls.

20. The multi-layer composite coating of claim 13, wherein the carboxylic acid group-containing monomer (1) is one or more selected from the group consisting of acrylic acid and (meth)acrylic acid and the monomer containing a primary alcohol group is one or more selected from the group consisting of hydroxyethylacrylate, hydroxyethylmethacrylate, hydroxypropylacrylate, hydroxypropylmethacrylate and hydroxybutyl (meth)acrylate.

21. The multi-layer composite coating of claim 13, wherein (A) and (B) are curable at a temperature of from 60° C. to 140° C.

22. The multi-layer composite coating of claim 13, wherein the polyisocyanate crosslinking agent is at least one selected from the group consisting of 1,4-tetramethylene diisocyanate, 1,6-hexamethylene diisocyanate, isophorone diisocyanate, 4,4'-methylene-bis-(cyclohexyl isocyanate), p-phenylene diisocyanate, diphenylmethane-4,4'-diisocyanate, 2,4-toluene diisocyanate, 2,6-toluene diisocyanate, triphenylmethane-4,4',4"-triisocyanate, 1,2,4-benzene triisocyanate, polymethylene polyphenyl isocyanate, the isocyanurate of hexamethylene diisocyanate, the biuret of hexamethylene diisocyanate, the isocyanurate of isophorone diisocyanate meta-α,α,α',α'-tetramethylxylylenediisocyanate and para-α,α,α',α'-tetramethylxylylenediisocyanate.

23. The multi-layer composite of claim 13, wherein the ratio of hydroxyl groups in (A) to isocyanate groups in (B) is from 1.35:1 to 1.5:1.

24. The multi-layer composite coating of claim 13, wherein the mixture of monomers further comprises (5) a crosslinking monomer.

25. A coated substrate comprising:
(A) a substrate, and
(B) the multi-layer composite coating of claim 13, over at least a portion of the substrate.

26. The coated substrate of claim 25, wherein the substrate is selected from a metallic substrate and an elastomeric substrate.

27. A coated substrate comprising:
(A) a substrate, and
(B) the two-component, waterborne film-forming composition of claim 1 over at least a portion of the substrate.

28. The coated substrate of claim 27, wherein the substrate is selected from a metallic substrate and an elastomeric substrate.

* * * * *